United States Patent
Alaniz

(10) Patent No.: US 9,158,381 B2
(45) Date of Patent: Oct. 13, 2015

(54) MULTI-RESOLUTION GESTURE RECOGNITION

(71) Applicant: Arthur Alaniz, Cupertino, CA (US)

(72) Inventor: Arthur Alaniz, Cupertino, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 13/776,131

(22) Filed: Feb. 25, 2013

(65) Prior Publication Data

US 2014/0240213 A1 Aug. 28, 2014

(51) Int. Cl.
*G06F 3/01* (2006.01)

(52) U.S. Cl.
CPC ........................... *G06F 3/017* (2013.01)

(58) Field of Classification Search
CPC .............. G06F 3/011–3/015; G06F 3/017; G06K 9/00335; G06K 9/00342; G06K 9/00348; G06K 9/00355; A63F 2300/1087; A63F 2300/1093
USPC .................................................. 345/156–184
See application file for complete search history.

(56) References Cited

U.S. PATENT DOCUMENTS

| | | | |
|---|---|---|---|
| 5,168,531 A | 12/1992 | Sigel | |
| 7,148,913 B2 | 12/2006 | Keaton et al. | |
| 7,158,656 B2 | 1/2007 | Covell et al. | |
| 7,224,830 B2 | 5/2007 | Nefian et al. | |
| 7,274,800 B2 | 9/2007 | Nefian et al. | |
| 7,379,563 B2 | 5/2008 | Shamaie | |
| 7,574,020 B2 | 8/2009 | Shamaie | |
| 7,620,202 B2 | 11/2009 | Fujimura et al. | |
| 7,701,439 B2 | 4/2010 | Hillis et al. | |
| 7,853,041 B2 | 12/2010 | Shamaie | |
| 8,170,281 B2 | 5/2012 | Shamaie | |
| 8,180,114 B2 | 5/2012 | Nishihara et al. | |
| 8,314,775 B2 | 11/2012 | Westerman et al. | |
| 8,433,101 B2 * | 4/2013 | Xu et al. | 382/107 |
| 2004/0193413 A1 | 9/2004 | Wilson et al. | |
| 2005/0063564 A1 * | 3/2005 | Yamamoto et al. | 382/104 |
| 2008/0181459 A1 * | 7/2008 | Martin et al. | 382/103 |
| 2010/0027845 A1 * | 2/2010 | Kim et al. | 382/107 |
| 2010/0027846 A1 * | 2/2010 | Xu et al. | 382/107 |
| 2010/0027892 A1 * | 2/2010 | Guan et al. | 382/203 |
| 2011/0110560 A1 * | 5/2011 | Adhikari | 382/103 |
| 2011/0129124 A1 * | 6/2011 | Givon | 382/107 |
| 2011/0215147 A1 * | 9/2011 | Goncalves | 235/383 |
| 2012/0068917 A1 | 3/2012 | Huang et al. | |
| 2012/0069168 A1 | 3/2012 | Huang et al. | |
| 2012/0105613 A1 | 5/2012 | Weng et al. | |
| 2012/0113241 A1 * | 5/2012 | Sundaresan et al. | 348/77 |
| 2012/0223882 A1 | 9/2012 | Galor et al. | |
| 2012/0243792 A1 * | 9/2012 | Kostyukov et al. | 382/199 |
| 2013/0343605 A1 * | 12/2013 | Dal Mutto et al. | 382/103 |
| 2013/0343606 A1 * | 12/2013 | Dal Mutto et al. | 382/103 |

\* cited by examiner

*Primary Examiner* — Gene W Lee
(74) *Attorney, Agent, or Firm* — Kegler Brown Hill & Ritter; James J. Pingor

(57) ABSTRACT

Systems and methods for detecting and analyzing bodies visible to an input source are disclosed herein. Analysis of detected bodies can be used in gesture recognition. In particular embodiments, detection and recognition of hand and portions thereof, including fingers and portions thereof (e.g., fingertips) can be performed to recognize gestures related to the hand. Recognition and analysis of bodies visible to an input source can occur using, for example, blob detection techniques, machine learning techniques, and various calculative techniques including statistical analysis, application-specific equations, and estimations related to bodies anticipated to be visible to the input source.

6 Claims, 10 Drawing Sheets

MULTI-RESOLUTION GESTURE RECOGNITION

FIELD

This disclosure generally relates to computer vision and related technologies, and more specifically relates to identifying various bodies and sub-portions thereof for gesture recognition.

BACKGROUND

Interfaces between users and technology integrate a variety of components to allow the technology to receive input from a user. One direction pursued by interface designers has been in gesture recognition and similar technologies. Human or other motions can be identified and analyzed to trigger action related to electronic devices. The use of human motions to convey input to a device can provide a speedy, intuitive component to control the device, especially in instances when more traditional device controls (e.g., keyboard, mouse) are impracticable.

Despite obvious advantages, gesture recognition can be limited by the resolution of systems employing it. For example, while a basic motion sensor can recognize the presence of a hand in frame (e.g., within the "view" of one or more sensors capable of collecting input relevant to gesture recognition) merely by detecting motion, a determination of what the hand is doing is far less cut-and-dried. Systems today lack the granularity to robustly identify nuanced gestures, severely limiting the type and number of possible gestures that can be utilized for controlling various systems.

In a non-limiting example, current gesture recognition systems fail to distinguish between various portions of the human hand and its fingers. Many easy-to-learn gestures for controlling various systems can be distinguished and utilized based on specific arrangements of fingers. However, current techniques fail to consistently detect the portions of fingers that can be used to differentiate gestures, such as their presence, location and/or orientation by digit (e.g., which fingers are bent, where fingertips are placed, and others).

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods for detecting and analyzing bodies visible to an input source. Applications of such analysis can include gesture recognition.

In particular embodiments, detection and recognition of hand and portions thereof, including fingers and portions thereof (e.g., fingertips) can be performed to recognize gestures related to the hand.

Recognition and analysis of bodies visible to an input source can occur using, for example, blob detection techniques, machine learning techniques, and various calculative techniques including statistical analysis, application-specific equations, and estimations related to bodies anticipated to be visible to the input source. The recognition and analysis can be used for gesture recognition to interact with devices, and other purposes.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
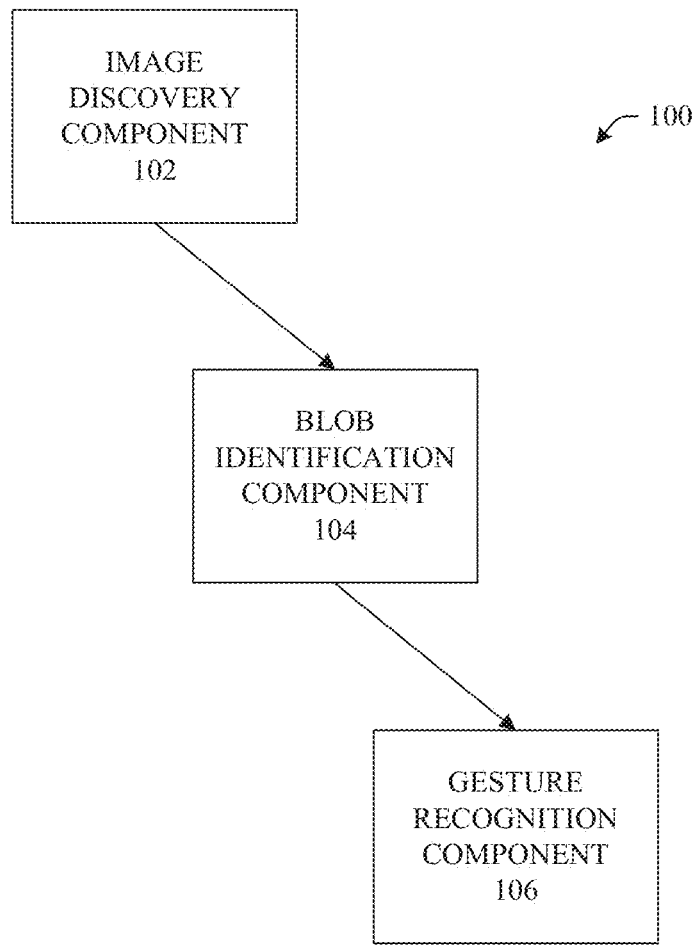
FIG. 1 illustrates an example block diagram of a system that facilitates gesture recognition.

The innovation is now described, e.g., with reference to the drawings and other aspects herein. In the following description and drawings (incorporated herein), for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this disclosure, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both/either an application running on a server and/or the server can be a component. One or more components can reside within a process and/or thread of execution, and a component can be localized on one computer and/or distributed between two or more computers.

A variety of implementations for computer-based aspects will be understood by those skilled in the art. In embodiments, various processing and/or storage devices including or coupled with displays can be used with aspects herein. For example, aspects herein can recognize one or more gestures performed by a hand, and an action can be taken in response at least in part by components involving computerized function. In an embodiment, a "heads-up display" within a vehicle (e.g., display visible in regular field of view during driving) can reflect action resultant from gesture recognition. In alternative or complementary embodiments, traditional controls and indicators (e.g., meters and gages below dash board, display associated with center console, shifter, steering apparatus, throttle) within an automobile can reflect changes effected by gesture recognition.

As used herein, the term "body" can be any entity or portion of an entity moving in a frame or view in which gesture recognition can be performed. For example, a hand moving within the field of view of a camera or other sensor can be a body for purposes of the disclosures herein and claims unless otherwise noted. For illustrative purposes, it is also worth noting that the fingers of the hand can in turn be one or more bodies. A primary body or area can be the entire hand, or a largest portion of the hand (e.g., the palm), while secondary and tertiary bodies or areas can be smaller portions of the hand, such as fingers, or particular portions of fingers (e.g., fingertips).

This generalized description of the term "body" should not be read to exclude an entire human (or other) body as a sum of all parts (e.g., head, including sub-parts of head such as eyes and mouth; torso; arms, including sub-parts of arms such as arm above elbow, arm below elbow, and hand; legs, including sub-parts of legs such as leg above knee, leg below knee, and feet). The disclosures herein support instances or embodiments where the motions of an entire human body are analyzed to determine one or more gestures for recognition. The same techniques described for identifying and/or isolating fingers and fingertips with respect to a palm can be employed to discretize limbs and other sub-portions of a human (or other) body in motion.

Bodies can be identified using blob detection/identification and/or other techniques. Blob detection generally refers to a series of techniques and algorithms in computer and/or machine vision for identifying objects and/or distinguishing aspects detected by a sensor. While techniques described herein refer specifically to differential methods of blob detection, it is to be appreciated that other components (e.g., identification of local extrema) can be employed alternatively or in accompaniment. Other techniques for identifying bodies, or improving the accuracy of their identification, can include the use of various filters and/or processing algorithms (e.g., image subtraction). For example, by using a median filter, noise can be reduced, or details irrelevant to a current stage of processing (e.g., decreasing significance of fingers when concerned with palm) can be masked.

Various inputs, images, data and/or information can be described in multiple versions or with respect to previously non-defined versions. Those skilled in the art will appreciate that throughout image processing and other aspects modifying inputs herein, copies can be generated and modified while preserving information from before modification. Embodiments herein will rely upon comparison and cross-processing of "before" and "after" versions of an input (e.g., original image, image with particular parameters applied, image with parameters applied and difference of Gaussian processing), and unless expressly set forth otherwise, it should be understood that previous versions (or other language representing modifications, alternatives and/or editions not expressly recited) are recoverable and in-use through termination of a methodology or during utilization of a system.

In an example functioning of techniques as described herein, gesture recognition including different portions of a human hand can be achieved. A capture component can be employed to capture a video or series of still frames including at least a perspective of a gesture to be recognized. In embodiments, alternative methods of gesture capture can be employed. For example, in addition to changes to an image frame, sub-aspects thereof such as light and shadow can be analyzed. In other embodiments, changes to electrical fields can be detected to determine motion in space. In alternative or complementary embodiments, techniques involving changes in temperature or thermal detection can be employed. Reflective energy (e.g., sound waves or infrared beams) can be employed to detect an object's presence and/or motion through a space in one or more additional embodiments. In one or more embodiments, detection of vibration or pressure can be employed to discern motion with in a space. Once an object (e.g., body) is detected in a space, and its bounds defined through the motion, identification of body/bodies and processing of one or more gestures can begin.

The gesture can be recognized using blob detection and analysis of the corresponding blobs. An amplitude threshold and a distance threshold can be determined to facilitate enhancement or other modification of blobs with respect to the input frame in which they are visible. Thereafter, amplitude threshold and distance threshold can be utilized to determine a combination threshold. Any or all of these thresholds can be utilized to set parameters associated with the capture component to best emphasize the body in frame and reduce image noise. In embodiments, image subtraction techniques can be employed in conjunction with thresholds to develop enhanced or modified resultant inputs. In alternative or complementary embodiments, application of various thresholds can be performed at an image processing step separate from and/or employ components separate from, the capture component. At least a primary blob representing the body can be included in frame after applying various thresholds to parameters of the capture component. The primary blob can be, for example, a body (e.g., a hand) which includes sub-portions (e.g., different joints of different fingers) capable of articulating and adding further resolution to a gesture to be recognized. In the example provided, hand image subtraction can be employed to isolate and identify fingers and fingertips.

Various levels of detail can be identified between a primary blob and sub-portions using image processing techniques described herein. A large median filter, for example, can be employed to remove or isolate certain sub-portions of the primary blob. A large difference of Gaussian can be employed to identify or isolate the primary blob without sub-portions. A small difference of Gaussian can be used to identify smaller blobs or define details similar to an edge blob (e.g., FIG. 8). In the example above focused in a hand gesture, a large median filter can be used to remove fingers, and a large difference of Gaussian can be used to identify a palm blob. A small difference of Gaussian can identify finger/edge blobs. By subtracting the large and/or small difference(s) of Gaussian from a base image (e.g., processed or original) or another difference of Gaussian, portions can be isolated independently. With distinct blobs representing primary and sub-portion blobs identified, various machine learning techniques can be employed to find the fingers for independent analysis. Area, distance and Hu moments can be utilized with various regressions to isolate fingers.

In the above hand-based example, fingertip detection (and/or detection of various articulations of fingers) can be accomplished by discovering finger blobs' central moments and centroids. The central moments can be used to calculate eigenvalues and eigenvectors, and a maximum eigenvector can be used to determine the main axis (e.g., a line along the length of the finger blob representing its direction with respect to the palm) of a particular finger. The palm blob's centroid can be discovered, and used in calculations with the finger blobs' centroids to discover finger-to-palm vectors. In an embodiment, subtracting the finger blob and palm blob centroids can be performed to find a finger-to-palm vector. The finger-to-palm vector can be used, at least in part, to determine or confirm which side of a finger blob represents the fingertip and which side of a finger blob inserts into the knuckles of the hand.

An arbitrary horizontal axis can be defined that is used for reference within calculations. Using a finger's main axis (resolved via the maximum eigenvector for a respective finger blob) and the finger-to-palm vector, a finger angle with respect to the horizontal axis can be defined.

A partial length representing the distance from the finger blob centroid to the fingertip can be estimated using calculations involving various eigenvalues calculated supra. In embodiments, this length can be estimated by subtracting the square root of a smallest eigenvector value from the square root of a largest eigenvector value.

Using the partial length and the finger angle calculated above, a finger centroid to fingertip vector can be determined. In this way, a fingertip, or the last digit of a respective finger, can be identified and isolated in a finger blob. Various techniques including measuring width and subtraction of noisy segments can assist with or verify such determinations in complementary and/or alternative techniques for discovering fingertips.

Various other values and estimations can be performed using the quantities and reference measurements set forth above to identify and isolate various other aspects related to fingers or other bodies for use in gesture recognition.

While machine learning is discussed in specific portions, various algorithms and techniques can be employed to recognize images or portions of images in embodiments complementary or alternative to those above concerning blob recognition and filtering. In the above example, a machine algorithm can be employed to recognize a hand shape and different composite parts thereof.

Using the isolated primary and sub-portion blobs, changes to the frame can be analyzed to accomplish gesture recognition. Various relationships between blobs can be used to recognize a gesture including movements of sub-portions. In embodiments, the gesture can be the presence of fingertips. For example, a variety of gestures can be distinguished by the number of fingertips present in frame.

Actions can be taken in response to a gesture. For example, a particular sub-portion of motion (e.g., fingertips) can express a gesture triggering action that can be detected through multi-step isolation of the sub-portion. In an alternative example, a larger gesture including a primary blob (alone or in combination with sub-portions) can be analyzed to generate a response to the gesture. In embodiments, various image processing and machine learning techniques herein can be utilized to improve a view of a gesture to be processed (e.g., reducing noise, isolating desired portions).

The above examples are provided not in order to provide comprehensive or exhaustive detailing of all techniques cognizable under these disclosures, but rather to suggest the spirit of the innovation, and should not be read to limit the breadth of other aspects herein. Various alternative or complementary techniques employable in one or more aspects described above to similar or complementary effect without departing from the scope of the innovation. The disclosure is now described in relation to the figures.

FIG. 1 illustrates an example block diagram of a system 100 that facilitates gesture recognition. System 100 includes image discovery component 102, blob identification component 104, and gesture recognition component 106.

Image discovery component 102 can include sensors (e.g., image sensors such as video camera tubes, charge-coupled devices, complementary metal oxide semiconductor active pixel sensors, infrared and/or thermal sensors, sensors associated with an image intensifier, and others) that receive at least one frame capturing at least a portion of a gesture (e.g., by a human hand). In one or more embodiments, image discovery component 102 can be integrated into or with other components (e.g., 104, 106). This image record of the gesture can be provided to blob identification component 104 for processing that facilitates gesture recognition.

Blob identification component 104 can use various blob identification techniques to identify one or more bodies performing the gesture. For example, a hand and fingers can perform a gesture in a frame or space covered by image discovery component 102. Blob identification component 104 can utilize blob identification algorithms to identify one or more blobs. The one or more blobs can be the entire hand, or various portions of the hand in relation to one another, such as the palm, fingers, and fingertips. In embodiments, blob identification component 104 can provide a plurality of different versions of a captured gesture to gesture recognition component 106 that accentuate or attenuate various aspects related to the gesture. For example (e.g., as in FIG. 8), various steps or processed portions can be used to exclusively display the palm, fingers, or fingertips.

Once the appropriate bodies are identified using blob identification or other techniques, one or more gestures performed by the bodies can be recognized by gesture recognition component 106. In various embodiments, the presence of one or more fingertip blobs can be the gesture identified. In a non-limiting example, two fingers held apart could indicate changing a radio station to a different preset while driving. In another non-limiting example, three fingers held together can change information displayed in a vehicle heads-up display.

Figure 2:
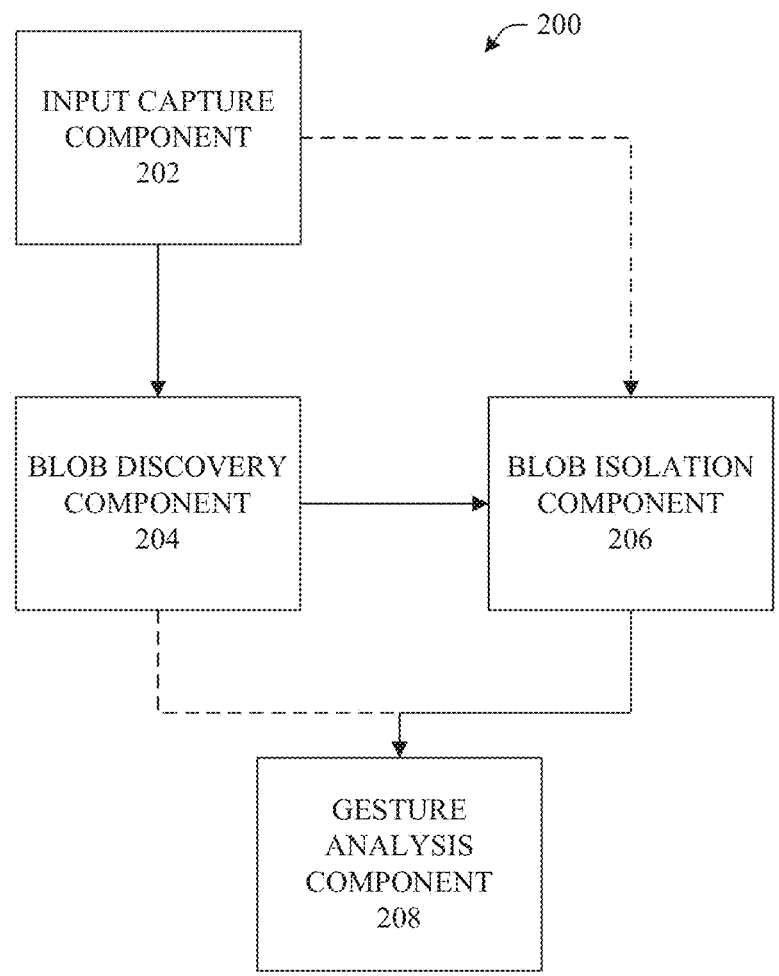
FIG. 2 illustrates an example block diagram of a system that provides user for recognizing motion of one or more moving bodies.

FIG. 2 illustrates an example block diagram of a system 200 that provides user for recognizing motion of one or more moving bodies. System 200 can include input capture component 202, blob discovery component 204, blob isolation component 206, and gesture analysis component 208.

Input capture component 202 can receive at least one image for processing that is provided to blob discovery component 204. Blob discovery component 204 performs various image processing steps to discover one or more relevant blobs within the image(s). In embodiments, blob discovery component 204 can employ various image parameters, thresholds, or filters to emphasize or minimize features included in the image(s) from input capture component 202. In embodiments, image copies can be generated using various image parameters or thresholds (e.g., amplitude threshold, distance threshold, other thresholds, combinations thereof), and image subtraction can be performed to provide subsequent image copies or versions reducing noise or increasing contrast between desired features and unwanted features of image(s). In still further complementary or alternative embodiments, filters (e.g., median filter, difference of Gaussians set to a particular size) can be used to reduce noise or remove details unwanted in a particular processing step of blob discovery performed by blob discovery component 204 (or other components). Blob discovery component 204 can identify at least a main blob or plurality of blobs from which further details can be discovered through further iterations of blob identification at varying resolutions (e.g., by blob isolation component 206). In embodiments, machine learning can be employed to discover one or more blobs (e.g., identifying hand-like shapes), and/or exclude features of one or more images (e.g., where a hand is to be recognized, limiting a number of recognized fingers to five, or excluding finger suspects that are not attached to the largest blob representing the entire hand).

Blob isolation component 206 can perform various image processing and machine recognition steps to decompose one or more blobs into sub-aspects for individual analysis or analysis in concert that can define gestures. In a hand-gesture example, a blob that emphasizes finger detail can be identified in at least one image by applying a small difference of Gaussians. In embodiments, a similar result can be effected utilizing edge detection. After producing a blob capable of isolating finger details, a palm blob can be isolated by blob isolation component 206 by applying a large difference of Gaussians to a copy of the original image to remove smaller aspects related to the fingers. In embodiments, a large median filter can be utilized before the large difference of Gaussians to remove additional finger detail before isolating the palm blob. Using image subtraction, the palm blob can be removed from the finger-detail blob, isolating only fingers.

In embodiments, various machine learning techniques (e.g., with parameters involving area, distance, Hu moments) can be used to find or add credibility to a finding of a series of isolated finger blobs. In embodiments, a logistic regression can be used in machine learning to isolate finger blobs for finger detection. In alternative embodiments, support vector machines can be employed in machine learning to isolate finger blobs for finger detection.

Blob isolation component 206 can isolate several levels of sub-blobs (e.g., fingers from hand, fingertips from fingers). In addition to the image processing and machine learning techniques, various application-specific calculations or estimates can be employed to provide sufficient focus and granularity for gesture recognition purposes. For example, moments, centroids, eigenvectors, and eigenvalues can be used to calculate geometric aspects of blobs to determine specifically or estimate the location and behavior of particular sub-blobs.

In an example related to the hand gesture techniques described above, centroids can be found for each respective finger blob and a palm blob, and central moments can be identified in each finger blob. A palm-to-finger vector can be found by subtracting the centroids of the finger and palm blobs. Using the central moments of the finger blobs, eigenvalues and eigenvectors can be determined. A maximum eigenvector can be used to determine a corresponding eigenvector on-axis with the finger and a main axis of each respective finger blob along its length. The palm-to-finger vector and main axis of the finger can be used to determine an angle (measured, e.g., with respect to an arbitrary horizontal axis) that facilitates proper recognition of the finger blob and its orientation (e.g., with respect to the palm, distinguishing the fingertip from the knuckle when viewed in isolation). An estimated length to fingertip (e.g., from centroid, from knuckle) can be calculated using eigenvalues. For example, the square root of a large eigenvalue less the square root of a small eigenvalue associated with a finger blob can be used to estimate a value associated with a length to fingertip. This can be used to isolate or increase confidence in isolation of a portion of a blob (e.g., fingertip) in conjunction with other methods (e.g., image subtraction removing oversize palm blob from hand blob).

Input capture component 202 can provide at least one image to blob discovery component 204, and in some embodiments, provide at least one image (the same or different) to blob isolation component 206. Blob discovery component 204 can discover one or more blobs of interest, and provide information at least related to the blobs to blob isolation component 206. Blob isolation component 206 thereafter provides isolated blob information (alone or in combination with the blobs of interest discovered by blob discovery component 204) to gesture analysis component 208. Gesture analysis component 208 can use machine learning or other techniques to identify a gesture related to the blobs (e.g., a number of fingers and their respective orientations) to identify a gesture based at least in part on the blob detection and isolations performed by blob detection component 204 and blob isolation component 206.

Figure 3:
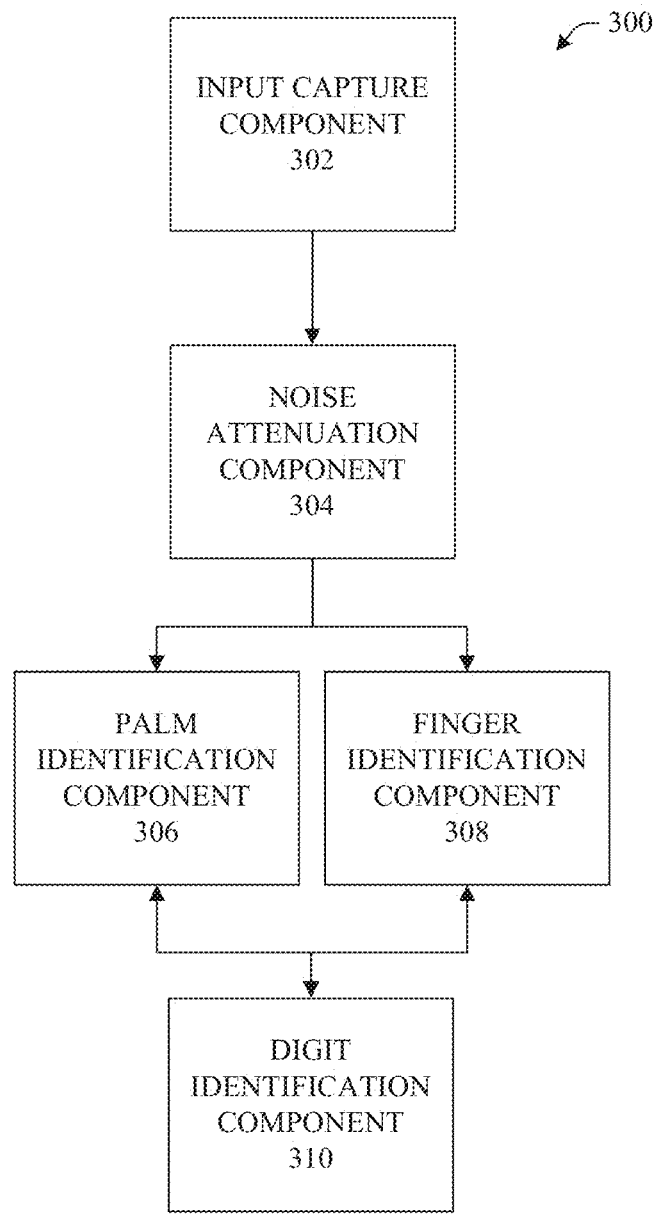
FIG. 3 illustrates an example block diagram of a system that identifies finger digits.

Turning now to FIG. 3, illustrated is an example block diagram of a system 300 that identifies finger digits. System 300 can include input capture component 302, noise attenuation component 304, palm identification component 306, finger identification component 308, and digit identification component 310.

Input capture component 302 can capture information including at least an image of a hand for image processing. In embodiments, image capture component 302 can be a sub-component of other components herein, or include other components herein. For example, in embodiments, input capture component 302 and noise attenuation component 304 can be combined such that input capture component 302 includes noise-attenuating aspects or performs some functions related thereto. In other embodiments, these components are wholly independent.

Noise attenuation component 304 can receive input from input capture component 302. Noise attenuation component 304 can apply various thresholds, filters or parameters to reduce noise in input and emphasize aspects to be processed or analyzed.

Palm identification component 306 and finger identification component 308 can receive input from input capture 302, before or after enhancement by noise attenuation component 304. Palm identification component 306 can use one or more image processing techniques, blob identification techniques, machine learning techniques, and/or other computer vision techniques to identify the at least the palm or back area of the hand as distinguished from the fingers. Finger identification component 308 can identify at least the fingers of the hand as distinguished from the palm and other portions using one or more image processing techniques, blob identification techniques, machine learning techniques, and/or other computer vision techniques.

Once the palm and fingers are identified, various image processing techniques, blob identification techniques, machine learning techniques, and/or other computer vision techniques, as well as various calculations, measurements and estimations, can be employed by digit identification component to identify particular digits of fingers or other portions of the hand. Image subtraction and other techniques can be used to isolate digits, or their presence, location, orientation, and movement can be analyzed in view of the entire hand or particular portions thereof.

It is to be appreciated that while system 300 is focused in identification of hands and sub-portions thereof, components 306-310 can be modified to identify and/or analyze other portions of the body (or other moving objects) to identify gestures or other actions.

Figure 4:
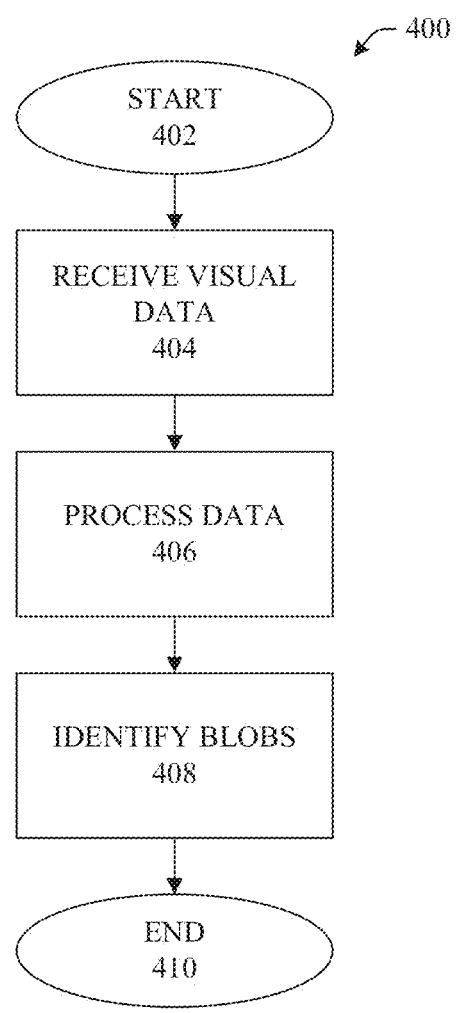
FIG. 4 illustrates an example block diagram of a methodology that identifies a gesture.

FIG. 4 illustrates an example block diagram of a methodology 400 that identifies a gesture. Methodology 400 can start at 402 and proceed to receive visual data at 404. Visual data can be received, for example, from various still or motion cameras, and can (but need not) include aspects such as thermal detection, image intensification, various lenses or filters, and so forth. In some embodiments, multiple angles or types of visual data can be received at 404 to provide various options for blob identification at 408.

At 406, the visual data is processed. Data processing can include, but is not limited to, image processing that prepares the visual data for blob identification at 408. For example, various thresholds can be applied to reduce noise and maximize contrast between an item in the visual data to be identified and one or more portions of background. In embodiments, filters and other processes can be applied to visual data to accentuate desirable portions of the data and eliminate others.

At 408, blobs are identified from within the visual data. In some embodiments, a specific algorithm can be provided to identify one or more blobs specifically expected within the visual data. For example, hand blobs can be detected and identified using a combination of image processing and machine learning. Image subtraction, median filters, difference-of-difference-of-Gaussian processing, and calculations relating to blob and sub-blob moments, centroids, eigenvectors and eigenvalues are used in conjunction with machine learning techniques to identify not only the hand but also the palm, fingers and fingertips. In other embodiments, less specific sequences of processing can be employed to identify blobs where pluralities of possible blob shapes are expected (e.g., hand blobs and facial feature blobs supported by the same source of visual data). Upon identification of the blob(s) at 408, methodology 400 can end at 410.

Figure 5:
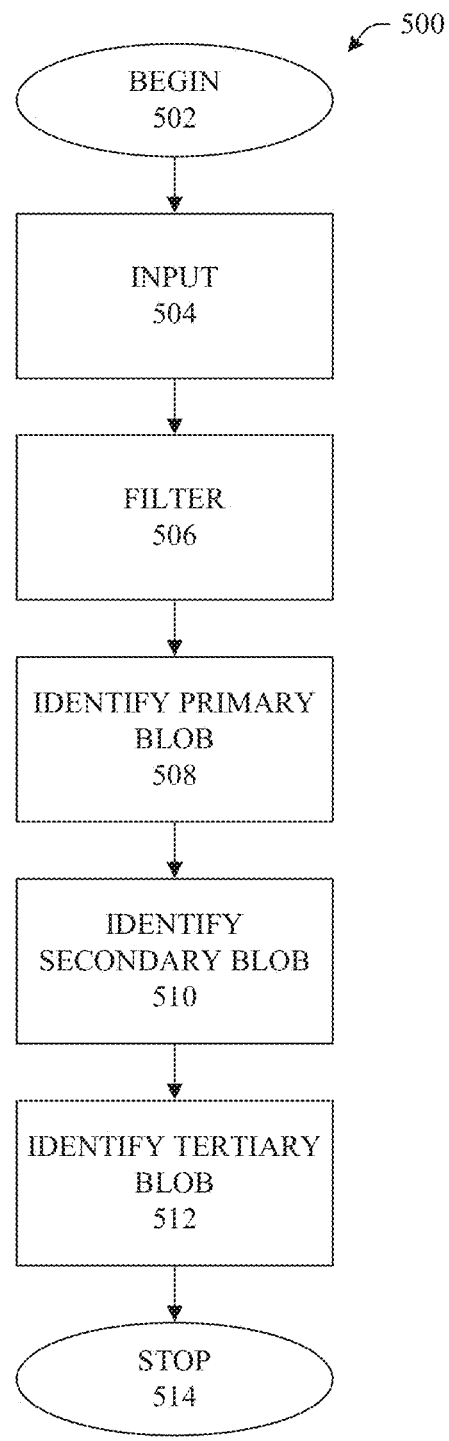
FIG. 5 illustrates an example block diagram of a methodology that identifies a plurality of bodies using blob recognition.

FIG. 5 illustrates an example block diagram of a methodology that identifies a plurality of bodies using blob recognition. Methodology 500 begins at 502 and proceeds to 504 where an input is received and/or recorded. Input at 504 can include still or moving video information.

At 506, a filter can be applied to modify the input (original or copies) to facilitate blob identification between 508 and 512. The filter can, for example, emphasize or remove aspects of a blob to be identified (e.g., various band pass filters for sharpening or un-sharpening) or create more uniform information for later processing (e.g., noise reduction). In embodiments, application of one or more filters at 506 is optional. In alternative embodiments, the one or more filters of 506 can be performed concurrently or as a sub-aspect of a different point of methodology 500.

At 508, a primary blob is identified. Blobs can be identified using one or more of blob detection (e.g., differential methods), machine learning, and/or other computer vision techniques. A primary blob can be a largest blob or a blob to which other blobs connect or with which other blobs interact. In embodiments, the primary blob identified at 508 can be an entire hand, or the palm or back of the hand as the largest part of the hand.

At 510, one or more secondary blobs are identified. The secondary blobs can be identified using the same, similar, or different methods as were used to identify the primary blob. In embodiments, one or more of blob detection (e.g., differential methods), machine learning, and/or other computer vision techniques can be employed to detect a secondary blob. Secondary blobs can be mid-sized or small blobs that are connected to or that interact with the primary blob. In embodiments, one or more secondary blobs can include one or more fingers with respect to a hand.

At 512, one or more tertiary blobs are identified. The tertiary blobs can be identified using the same, similar, or different methods as were used to identify the primary and/or secondary blob(s). In embodiments, one or more of blob detection (e.g., differential methods), machine learning, and/or other computer vision techniques can be employed to detect a tertiary blob. Tertiary blobs can blobs connected to or that interact with one or more secondary blobs. In embodiments, one or more tertiary blobs can include one or more fingertips (or other portions of a finger) with respect to a hand.

Thereafter, methodology 500 can proceed to stop at 514. It is to be appreciated that while methodology 500's examples are directed to the context of the human hand, other techniques involving the identification of multiple blobs and their relationships can be facilitated by aspects of methodology 500 and otherwise herein.

Figure 6:
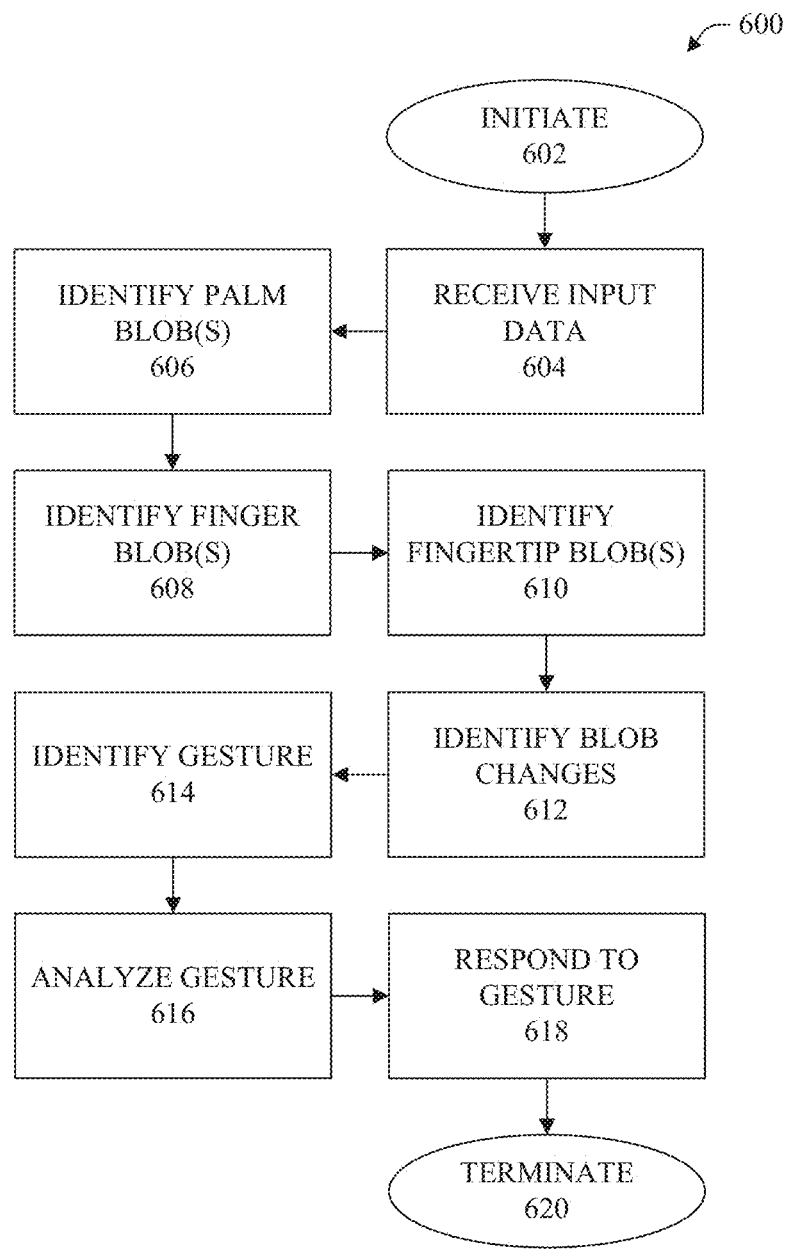
FIG. 6 illustrates an example block diagram of a methodology that responds to a gesture.

FIG. 6 illustrates an example block diagram of a methodology 600 that responds to a gesture. At 602, methodology 600 is initiated, and proceeds to 604 where input data is received. Input data can include one or more images depicting at least one hand. At 606, at least one palm blob is identified. In embodiments, oversized estimations of palm blob geometry can be generated (e.g., using a large difference of Gaussians) to facilitate estimation of fingertips using image subtraction at other steps. In embodiments, a median filter can precede application of the large difference of Gaussians to remove fingers and noise.

At 608, one or more finger blobs are identified. In embodiments, a small difference of Gaussians can be applied to an original image to produce one or more carefully focused finger blob(s) or an edge blob to be used in blob identification related to fingers.

At 610, fingertip blobs can be identified. A plurality of methods can be used to find fingertip blobs, ensuring the appropriate fingertip blobs are located even if one method is inconclusive, and/or to build confidence in the finding by comparing multiple results. To ensure recording of the proper orientation of fingers and/or fingertips in later steps (e.g., after performing an image subtraction isolating the fingers), various vectors can be calculated and stored with respect to two or more centroids (e.g. palm centroid and one or more finger centroids) and/or arbitrary axes (e.g., arbitrary x-axis representing horizontal through image).

In an embodiment (non-exclusive) of fingertip identification at 610, image subtraction can be used to remove the oversized estimation of the palm blob generated at 606 from the finger blob(s) identified at 608, resulting in an estimated fingertip difference.

In an embodiment (non-exclusive) of fingertip identification at 610, length estimations can be performed to identify the portion of the finger representing the fingertip (or another portion of the finger). In an embodiment, eigenvalues associated with a finger blob can be summed or subtracted to identify various portions of length associated with the fingertip.

In an embodiment (non-exclusive), image subtraction and length estimation can be utilized in combination to ensure robust fingertip identification. In embodiments, the results of both techniques performed independently can be compared to ensure a confidence level in fingertip identification. Various statistical or other comparative calculative techniques can be performed to determine a confidence level regarding fingertip identification. In embodiments, fingertip identification (e.g., visual depiction of fingertips, geometric description of fingertips, numerically expressed location of fingertips) can be developed from a combined fingertip identification employing two or more methods. Combination in such embodiments can include averaging, machine learning techniques, and others.

Figure 7:
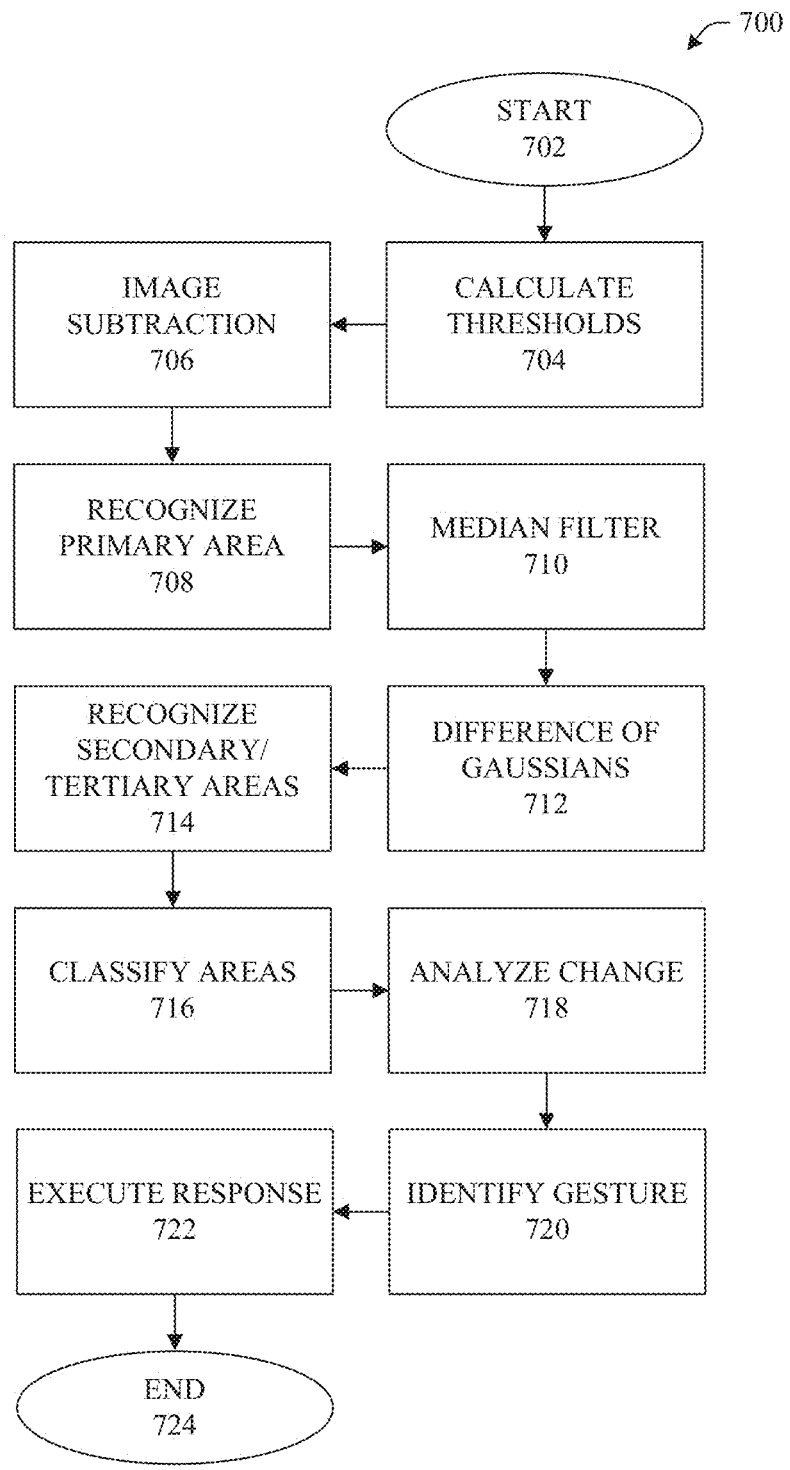
FIG. 7 illustrates an example block diagram of a methodology that executes a response to a gesture including a plurality of gesturing areas.

Turning now to FIG. 7, illustrated is an example block diagram of a methodology 700 that executes a response to a gesture including a plurality of gesturing areas. Methodology 700 starts at 702 and proceeds to calculate image thresholds that improve image qualities for processing at 704. In embodiments, thresholds can include amplitude thresholds and distance thresholds. An amplitude threshold can relate to, for example, image brightness by pixel. A distance threshold can relate to, for example, minimum and/or maximum distances at which to focus or analyze visual information. In embodiments, two or more thresholds can be combined to a combined threshold through addition of parameters, simultaneous or successive image subtraction, and other techniques.

At 706, image subtraction can be performed to remove at least portions of images to be disregarded based on thresholds or parameters calculated and/or applied at 704. Thereafter, a primary area can be discovered at 708 based at least in part on one or more of blob identification and machine learning. For example, the primary area can (but need not) be an entire human hand.

At 710, a median filter can be applied to remove details and allow isolation of the largest portions of the primary area. In the example above, the median filter can remove at least portions of the finger of the human hand to facilitate identification of a main portion (e.g., the palm). Other portions of an image to be utilized in gesture recognition can be intensified or attenuated to facilitate decomposition or identification and analysis of particular portions.

At 712, one or more difference(s) of Gaussians can be applied to one or more inputs (e.g., large difference of Gaussians to post-median-filter input, small difference of Gaussians to original or post-threshold input). Difference(s) of Gaussians calibrated to large or small tolerances can be used to process inputs to provide appropriate granularity for recognition of secondary and/or tertiary areas at 714. In embodiments, a difference-of-difference-of-Gaussians can be calculated and/or applied to one or more versions of the input.

At 714, the various versions and/or inputs can be analyzed to recognize secondary and tertiary areas. Secondary and tertiary areas can (but need not) include aspects connected to or that interact with a primary area (e.g., recognized at 708). Recognition of secondary and tertiary areas at 714 can be conduct at least in part using techniques of blob detection and/or machine learning in various embodiments. In the example above, secondary and tertiary areas can include fingers and/or digits of the fingers.

After recognizing secondary and tertiary areas at 714, the areas can be classified (e.g., by classifier or other statistical learning technique) at 716. Changes between images can be analyzed at 718 to determine the motion, allowing gesture identification at 720 based at least in part on the classification (e.g., 3 fingertips) and change over input (e.g., placed onto surface where they had not been previously). Upon identifying the gesture at 720, the appropriate response can be executed at 722. After executing the response to the gesture at 722, methodology 700 ends at 724.

Figure 8:
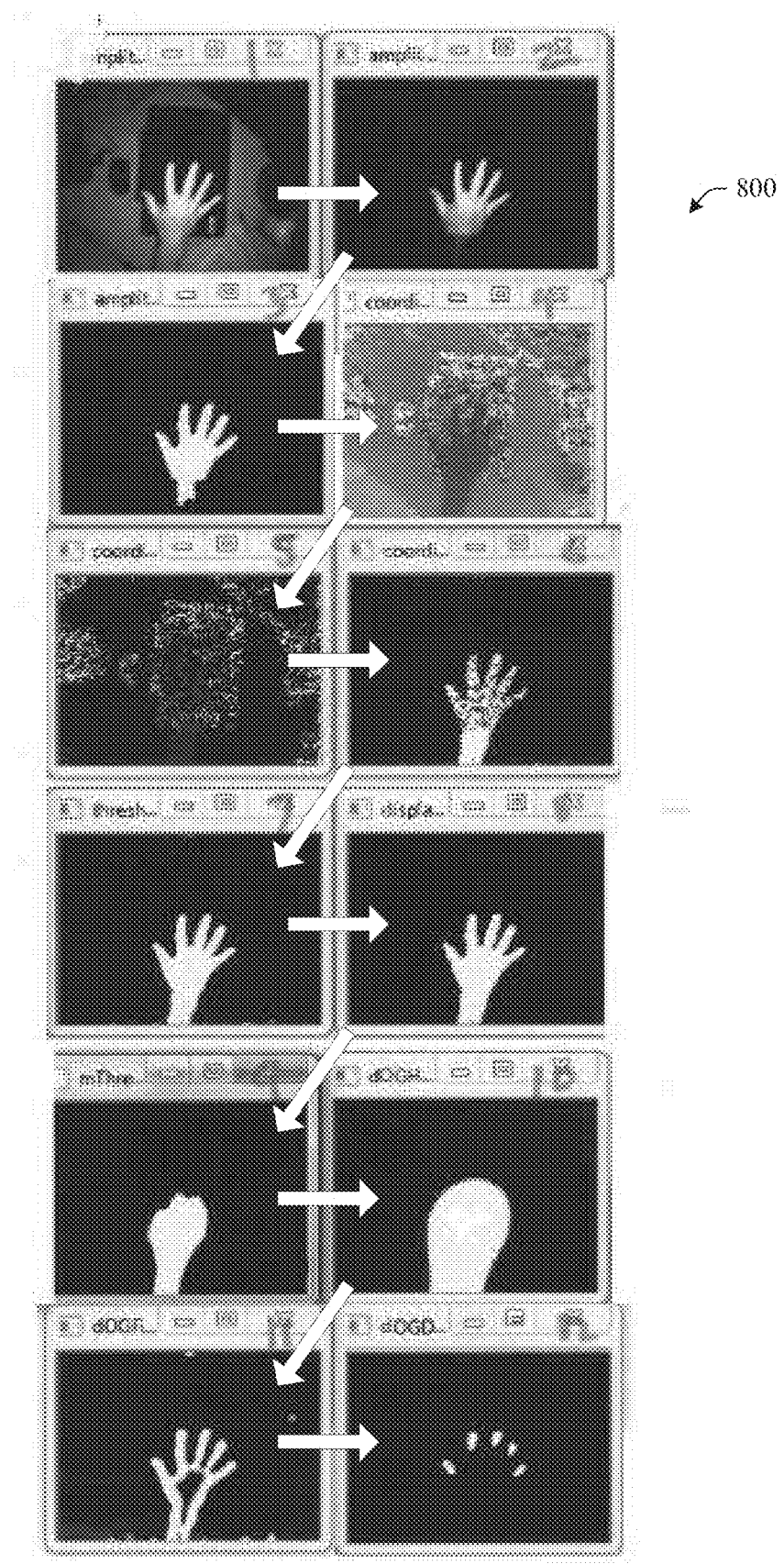
FIG. 8 illustrates an example interface depicting a progression through an embodiment of an algorithm described herein.

FIG. 8 illustrates example interfaces 800 depicting a progression through an embodiment of an algorithm cognizable under the disclosures herein. Example interfaces 800 show a series of image processing and blob detection aspects including post-processing images and estimations that can be used to produce a series of isolated fingertip blobs that can be used in gesture recognition and/or for other applications. It is to be appreciated that the progression displayed is for example purposes only, and that aspects depicted need not occur in the order suggested by the arrows or other aspects of the figures. Further, as is suggested by several aspects of the series, copies of images can be processed and not all successive aspects need have their inputs flow from an earlier aspect.

Figure 9:
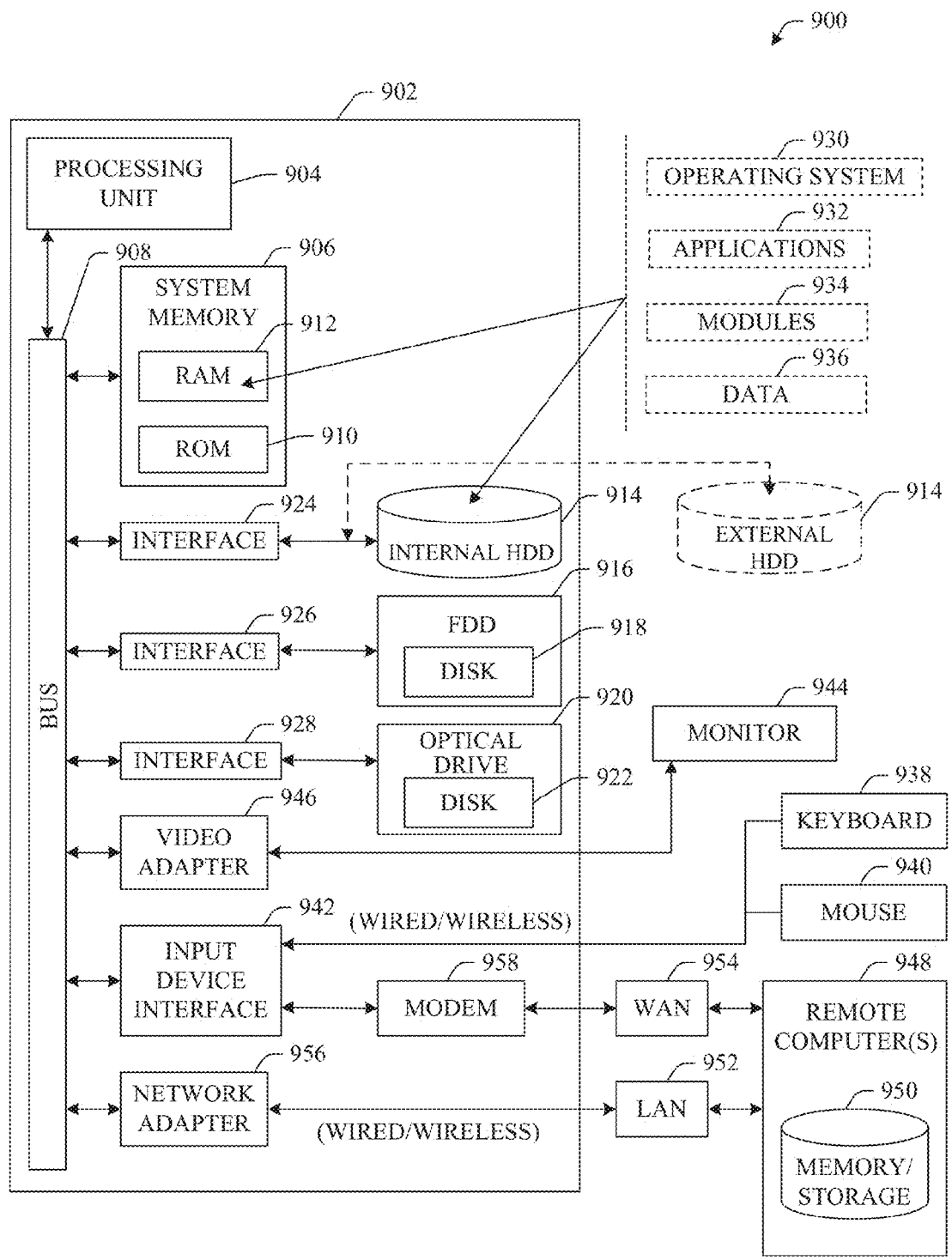
FIG. 9 illustrates a block diagram of an example computing system that can be used in conjunction with aspects described herein.
Figure 10:
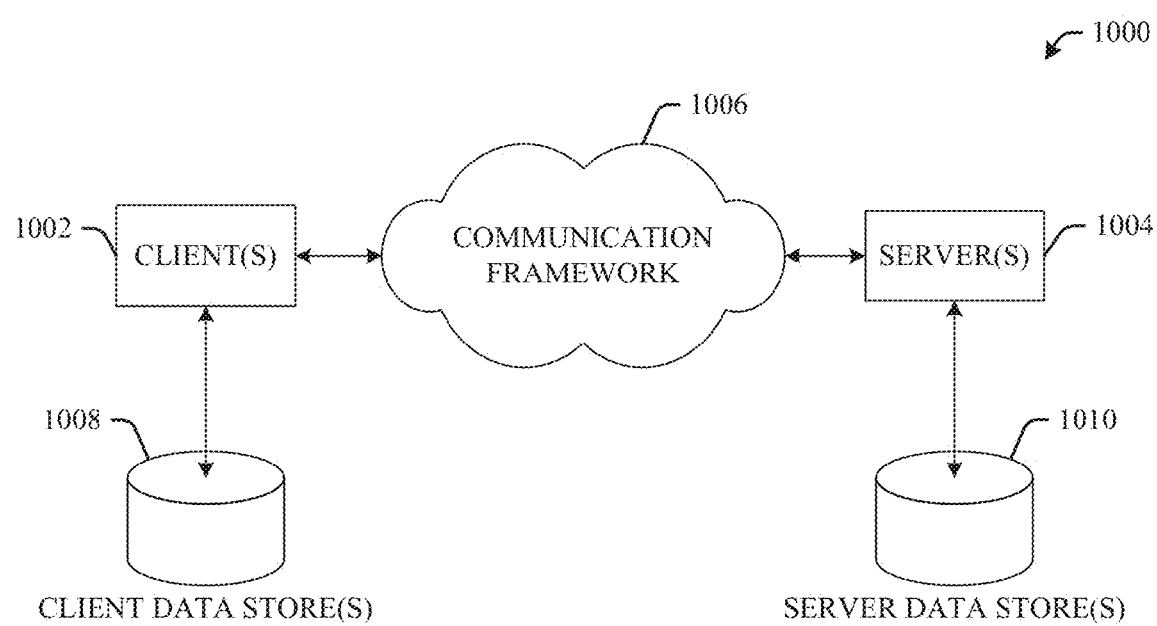
FIG. 10 illustrates a block diagram of an example network system that can be used in conjunction with aspects described herein.

FIG. 9 illustrates a brief general description of a suitable computing environment wherein the various aspects of the subject innovation can be implemented, and FIG. 10 illustrates a schematic diagram of a client—server-computing environment wherein the various aspects of the subject innovation can be implemented.

With reference to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA). Alternatively or in addition, an external hard disk drive 915 may also be configured for external use in a suitable chassis (not shown), a magnetic disk drive, depicted as a floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drives 914, 915 magnetic disk drive 916 and optical disk drive 920 can be connected to the system bus 908 by a hard disk drive interface 924, a magnetic disk drive interface 926 and an optical drive interface 928, respectively. The interface 924 for external drive implementations can include Universal Serial Bus (USB), IEEE 1394 interface technologies, and/or other external drive connection technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and system memory 906, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, et cetera A monitor 944 or other type of display device is also connected to the system bus 908 via an interface, such as a video adapter 946. In addition to the monitor 944, a computer typically includes other peripheral output devices (not shown), such as speakers, printers, et cetera The computer 902 may operate in a networked environment using logical connections via wired and/or wireless communications to one or more remote computers, depicted as remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other components for establishing communications over the WAN 954, such as by way of the Internet. The modem 958, which can be internal or external and a wired or wireless device, is connected to the system bus 908 via the serial port interface 942 as depicted. It should be appreciated that the modem 958 can be connected via a USB connection, a PCMCIA connection, or another connection protocol. In a networked environment, program modules depicted relative to the computer 902, or portions thereof, can be stored in the remote memory/storage device 950. It will be appreciated that the network connections shown are exemplary and other components of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, et cetera) to provide secure, reliable, fast wireless connectivity. A Wi-Fi network can be used to connect computers to each other, to the Internet, and to wired networks (which use IEEE 802.3 or Ethernet).

FIG. 10 is a schematic block diagram of a sample-computing environment 1000 that can be employed for practicing aspects of the aforementioned methodology. The system 1000 includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The servers 1004 can house threads to perform transformations by employing the components described herein, for example. One possible communication between a client 1002 and a server 1004 may be in the form of a data packet adapted to be transmitted between two or more computer processes. The system 1000 includes a communication framework 1006 that can be employed to facilitate communications between the client(s) 1002 and the server(s) 1004. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the various versions. It is, of course, not possible to describe every conceivable combination of components or methodologies for purposes of describing the various versions, but one of ordinary skill in the art may recognize that many further combinations and permutations are possible. Accordingly, the subject specification intended to embrace all such alterations, modifications, and variations that fall within the spirit and scope of the appended claims.

It is appreciated that, while aspects of the subject innovation described herein focus in wholly-automated systems, this should not be read to exclude partially-automated or manual aspects from the scope of the subject innovation. Practicing portions or all of some embodiments manually does not violate the spirit of the subject innovation.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers, and so forth). Such components, inter alia, can automate certain mechanisms or processes performed thereby to make portions of the systems and methods more adaptive as well as efficient and intelligent. By way of example and not limitation, the aggregation of password rules can infer or predict support or the degree of parallelism provided by a machine based on previous interactions with the same or like machines under similar conditions. As another example, touch scoring can adapt to hacker patterns to adjust scoring to thwart successful approaches.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A gesture recognition system, comprising:
a processor that executes the following computer executable components stored in a memory:
an image discovery component that records a motion of at least one body in a view of one or more sensors that collect input data that comprises the motion;
a blob identification component that identifies a first detail and a second detail of the at least one body, the blob identification component comprises a difference of Gaussians filter, wherein a large difference of Gaussian identifies the first detail and a small difference of Gaussian identifies the second detail; and
a gesture recognition component that identifies a gesture based on an analysis of the first detail, wherein the blob identification component masks the second detail from the gesture recognition component.

2. The system of claim 1, wherein the blob identification component comprises a median filter.

3. The system of claim 2, wherein the blob identification component comprises a band-pass filter.

4. The system of claim 1, wherein the blob identification component comprises a blob isolation component that isolates at least one portion of the body.

5. The system of claim 4, wherein the gesture recognition component identifies a gesture involving at least two portions of the body.

6. The system of claim 4, wherein the at least one portion of the body is a fingertip.

* * * * *